United States Patent
Mirzakhanova et al.

(10) Patent No.: US 8,417,563 B1
(45) Date of Patent: Apr. 9, 2013

(54) ONE ROUND VOTING METHOD

(76) Inventors: Armik Mirzakhanova, Aurora, CO (US); Gary S. Mirzakhanov, Colorado Springs, CO (US)

( * ) Notice: Subject to any disclaimer, the term of this patent is extended or adjusted under 35 U.S.C. 154(b) by 0 days.

(21) Appl. No.: 13/374,267

(22) Filed: Dec. 20, 2011

Related U.S. Application Data

(60) Provisional application No. 61/471,089, filed on Apr. 1, 2011.

(51) Int. Cl.
  *G06F 11/00* (2006.01)
(52) U.S. Cl.
  USPC .............................................. 705/12; 235/386
(58) Field of Classification Search ...................... 705/12
  See application file for complete search history.

(56) References Cited

U.S. PATENT DOCUMENTS

2010/0106266 A1\* 4/2010 Mazurik ......................... 700/91
2011/0276507 A1\* 11/2011 O'Malley ..................... 705/321

OTHER PUBLICATIONS

FairVote.org. http://archive.fairvote.org/index.php?page=2469. 2009. Retrieved Oct. 3, 2012 online.*

\* cited by examiner

*Primary Examiner* — James A Reagan
(74) *Attorney, Agent, or Firm* — G. F. Gallinger

(57) ABSTRACT

A voting method requiring the voter to numerically rank, n candidates on a ballot; programming a computer to tally the number of 1'st priority votes for each candidate and then eliminate one candidate having the least number of 1'st priority votes, and then to recast the eliminated votes based on the 2'nd priority; if the number of remaining candidates n is $\geq 3$ then the computer is to again eliminate the candidate which has the least number of votes, including recast votes; whereafter the computer is to recast the votes assigned to the eliminated candidate, based on the ballot priority choices, and using a highest priority choice for the each voter to reassign his vote to one a remaining candidate; reiterating the immediately prior step until the number of remaining candidates is reduced to 2. The one candidate having the most initial and subsequently recast votes is determined the winner.

1 Claim, 2 Drawing Sheets

20 ↓

Figure 1:
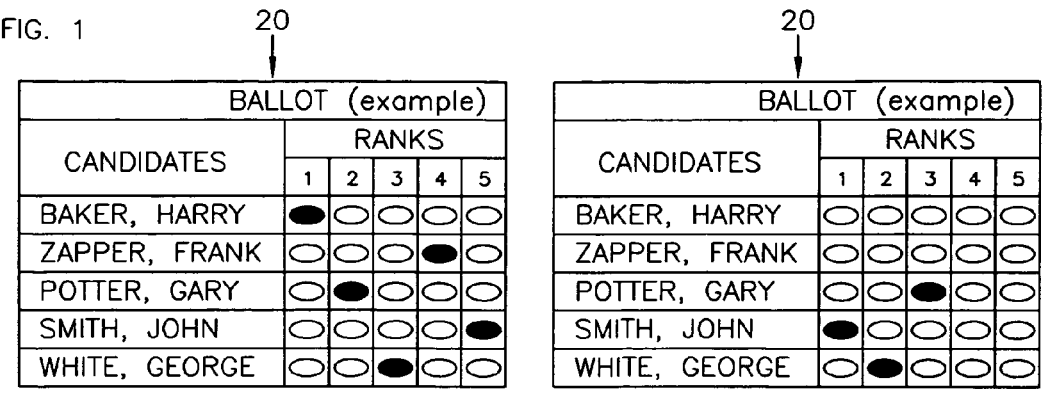

| CANDIDATES | RANKS | | | | |
|---|---|---|---|---|---|
| | 1 | 2 | 3 | 4 | 5 |
| BAKER, HARRY | ● | ○ | ○ | ○ | ○ |
| ZAPPER, FRANK | ○ | ○ | ○ | ● | ○ |
| POTTER, GARY | ○ | ● | ○ | ○ | ○ |
| SMITH, JOHN | ○ | ○ | ○ | ○ | ● |
| WHITE, GEORGE | ○ | ○ | ● | ○ | ○ |

BALLOT (example)

20 ↓

| CANDIDATES | RANKS | | | | |
|---|---|---|---|---|---|
| | 1 | 2 | 3 | 4 | 5 |
| BAKER, HARRY | ○ | ○ | ○ | ○ | ○ |
| ZAPPER, FRANK | ○ | ○ | ○ | ○ | ○ |
| POTTER, GARY | ○ | ○ | ● | ○ | ○ |
| SMITH, JOHN | ● | ○ | ○ | ○ | ○ |
| WHITE, GEORGE | ○ | ● | ○ | ○ | ○ |

BALLOT (example)

NOTE: WHERE — $n^*$ —IS THE NUMBER OF REMAINING CANDIDATES

ONE ROUND VOTING METHOD

PRIOR APPLICATION

This application claims the priority of U.S. provisional application 61/471,089 filed Apr. 1, 2011.

FIELD OF THE INVENTION

This invention relates to a method of voting and vote tallying which eliminates multiple rounds of voting as less successful candidates are eliminated. More particularly this invention relates to a method of voting wherein voters provide secondary choices so that if their initial choice is for a relatively unpopular candidate which is not in the running, then the voting tally uses their secondary choice to influence the outcome of the election.

BACKGROUND OF THE INVENTION

Municipalities frequently run multiple rounds of voting to most fairly reduce the number of candidates from several to two. After the first round of voting the leading candidate frequently may only have a lead of a few percent over two other contenders, with the support of say 15% of the total voters. It doesn't seem a good reflection of voter sentiment to elect a candidate for mayor who only has the support of a small minority of voters when multiple other candidates have almost similarly small minority support. This is especially the case when substantially more votes have been cast for the several weakest candidates than the winning candidate. The obvious solution is to eliminate the weakest candidates and hold yet another round of voting, thereby ensuring that the support for the weakest eliminated candidates is recast for the stronger candidates. After a few iterations, or rounds of voting, wherein the weaker candidates are gradually eliminated from the ballots, and when only two candidates remain, it is hoped that the winning candidate will be elected by a substantial percentage of the voters, and the will of the people will be better reflected by the voting results. Yet another solution to the problem is to eliminate all but the first and second ranked candidates after the first round of voting, and then to allocate the votes of the eliminated candidates to one of the remaining candidates based on their rankings of those remaining candidates. The largest problem with this multi-round voting approach is not only the cost of staffing the voting polling stations for multiple days. Another problem is the expense.

One alternative to multiple round voting is to simply have a single round of voting as is the case in federal presidential elections. A single round of voting does not necessarily ensure the best reflection of the will of the people. For example, in the 1992 federal election Bill Clinton beat the incumbent George H W Bush, as well as the independent businessman Ross Perot. It was subsequently surmised that Ross Perot largely cannibalized the votes that otherwise would have been cast for the incumbent President. The cost of multiple rounds of voting are generally very expensive, and in a federal elections multiple rounds of voting are deemed prohibitively expensive. What is needed is a better way of running an election for a single office. A method which is able to poll the electors and best chooses a candidate which best reflects the will of the people.

OBJECTS OF THE INVENTION

It is an object of this invention to disclose a method of voting which is better able to determine the will of the voters when multiple candidates are on a voting ballot for a single vacant position. It is an object of this invention to effectivly accomplish what multiple rounds of voting accomplish without the multiple expense of staging multiple elections. It is also an object of this invention to accomplish the effect of multiple rounds of voting in a time period equivalent to conducting an election with a single round of voting. It is finally an object of this invention to provide a method of voting wherein voters are able to reflect their sentiments on a wider range of issues than is defined by two major parties without disenfranchising themselves by voting for a candidate who is most likely not able to win.

One aspect of this invention provides for a method of voting and vote tallying when a voter must choose between n multiple candidates for a single vacant position comprising the following steps: a) requiring the voter to select and rank, to reflect his priority of choices for the single vacant position, one candidate and up to n candidates for the single open position; b) programming a computer to tally the number of 1'st rank votes for each candidate and then eliminate one candidate having the least number of 1'st rank votes from further consideration; c) recast the votes initially made for the eliminated candidate based on the 2'nd rank choice, and then recompile vote tallies for the remaining candidates; d) if the number of remaining candidates is $n \geq 3$ then programming a computer to eliminate from further consideration the candidate, in the remaining candidates, which has the least number of votes, including recast votes; e) programming a computer to recast the votes assigned to the eliminated candidate in steps (b) and (d), based on each of the ballots assigned to the eliminated candidate which show priority choices made by each voter for one of the remaining candidates, and using only highest priority choice of each voter to reassign his vote to one of these remaining candidates, the recast votes assigned are to include both originally cast and subsequently recast votes for the eliminated candidate in step (d); f) programming the computer to repeat step (e) above if the number of remaining candidates is $n \geq 3$; g) if the number of remaining candidates is n=2, declaring the candidate having the most initial and subsequently recast votes the winner. The will of each voter is thereby considered even when his preferred candidate(s) are eliminated, without the need for, the expense of, and the time required for succeeding elections when weaker candidates have been eliminated.

In a preferred aspect of this invention used where there are exceedingly large numbers of votes cast, the above method is applied wherein all possible permutations of rankings for candidates are determined, and then all ballots cast are identified in one of the possible permutations so that a number of ballots cast for each possible permutation of rankings is first determined, and then the process described in claim 1 is applied recasting all of the votes in each permutation as a group.

Various other objects, advantages and features of this invention will become apparent to those skilled in the art from the following description in conjunction with the accompanying drawings.

FIGURES OF THE INVENTION

FIG. 1 shows illustrative views of voting ballots wherein voters are required to rank multiple candidates, in an order which indicates their most preferred candidate down to their least preferred choice for a single vacant position.

Figure 2:
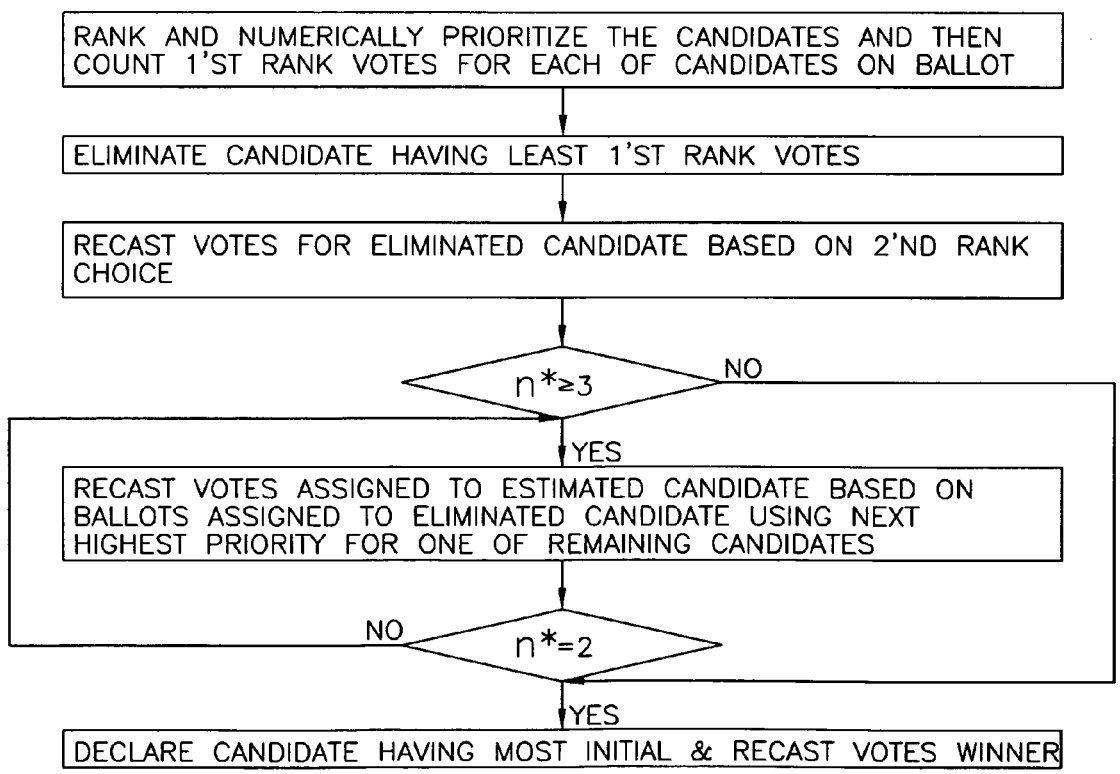

FIG. 2 is a schematic view of a vote tallying computer algorithm which in iterations selects the most overall preferred candidate from several (n) candidates on the ballot illustrated in FIG. 1 above, by eliminating the weakest candidate, and thereafter recasting those votes for the eliminated candidate among the n* or (n−1) remaining candidates, according to the order of preference indicated on the ballots of the eliminated candidate. Additional iterations are repeated wherein the next weakest of the remaining candidates are first eliminated and then recast according to the preferences expressed on the ballots, until such time as only two candidates (n=2) remain.

Figure 3:
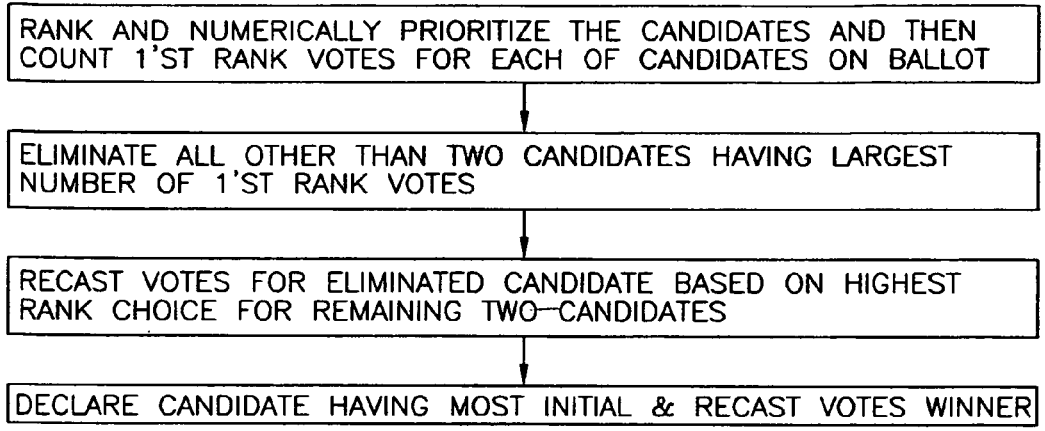

FIG. 3 is a schematic view of a vote tallying computer algorithm in which the computer initially selects two candidates which have the largest number of 1'st choice ballots. Remaining candidates are eliminated from the possibility of being chosen as the elected candidate. However, votes in eliminated ballots are recast based on ranked choices for the three non-eliminated candidates.

Figure 4:
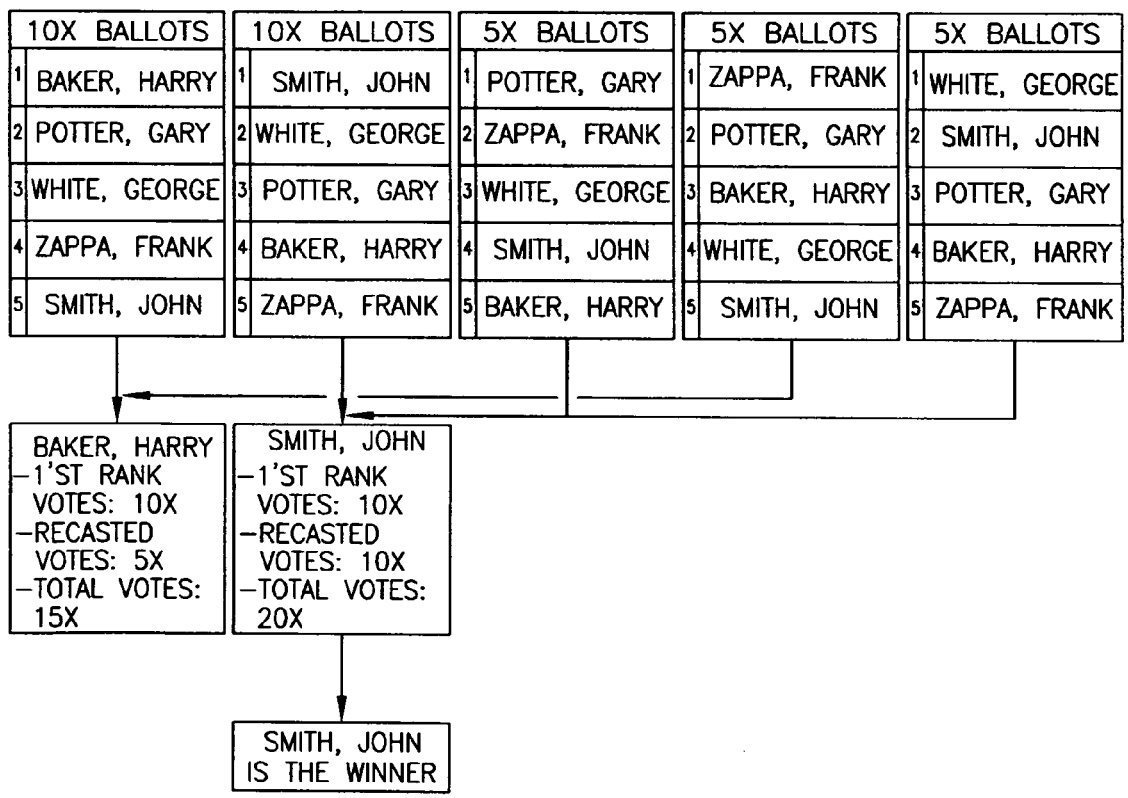

FIG. 4 is a more detailed illustration showing results which follow when using the above method when there are 5 different selections made on initially cast ballots.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have shows illustrative views of voting ballots 20 wherein voters are required to rank multiple candidates, in an order which indicates their most preferred candidate down to their least preferred choice for a single vacant position. FIG. 2 is a schematic view of a vote tallying computer algorithm which in iterations selects the most overall preferred candidate from several (n) candidates on the ballot illustrated in FIG. 1 above, by eliminating the weakest candidate, and thereafter recasting those votes for the eliminated candidate among the n* or (n−1) remaining candidates, according to the order of preference indicated on the ballots of the eliminated candidate. Additional iterations are repeated wherein the next weakest of the remaining candidates are first eliminated and then recast according to the preferences expressed on the ballots, until such time as only two candidates (n=2) remain. Most generally, a method of voting and vote tallying when a voter must choose between n≧3 candidates for a single vacant position comprising the following steps: a) requiring the voter to rank and numerically prioritize the candidates he chooses to select for the single vacant position on the ballot, to reflect his priority of choices; b) programming a computer to tally the number of 1'st rank votes for each candidate and then eliminate one candidate having the least number of 1'st rank votes from further consideration; c) recasting the votes initially made for the eliminated candidate based on the 2'nd rank choice, and then recompile vote tallies for the remaining candidates; d) if the number of remaining candidates is n≧3 then programming a computer to eliminate from further consideration the candidate, in the remaining candidates, which has the least number of votes, including recast votes; e) programming a computer to recast the votes assigned to the eliminated candidate in steps (b) and (d), based on each of the ballots assigned to the eliminated candidate which show priority choices made by each voter for one of the remaining candidates, and using only highest priority choice of each voter to reassign his vote to one of these remaining candidates, the recast votes assigned are to include both originally cast and subsequently recast votes for the eliminated candidate in step (d); f) programming the computer to repeat step (e) above if the number of remaining candidates is n≧3; g) if the number of remaining candidates is n=2, declaring the candidate having the most initial and subsequently recast votes the winner. The will of each voter is thereby even when his most preferred candidate(s) is eliminated, without the need for, the expense of, and the time required for succeeding elections when weaker candidates have been eliminated.

In a preferred method used where there are exceedingly large numbers of votes cast, all possible permutations of rankings for candidates are determined, and then all ballots cast are identified in one of the possible permutations so that a number of ballots cast for each possible permutation of rankings is first determined, and then the process described above is applied recasting all of the votes in each permutation as a group.

A problem that occurs with the above general method is that unexpected results may occur when none of the top two candidates are finally elected. Accordingly the above method may be adopted to ensure that only one of the top two initially chosen candidates can become the final winner (or elected candidate). The above general method may be accordingly adapted. FIG. 3 is a schematic view of a vote tallying computer algorithm in which the computer initially selects two candidates which have the largest number of 1'st choice ballots. Remaining candidates are eliminated from the possibility of being chosen as the elected candidate. However, votes in eliminated ballots are recast based on ranked choices for the three non-eliminated candidates. A method of voting and vote tallying when a voter must choose between n≧3 candidates for a single vacant position comprising the following steps: a) requiring the voter to rank and numerically prioritize the candidates he chooses to select for the single vacant position on the ballot, to reflect his priority of choices; b) programming a computer to tally the number of 1'st rank votes for each candidate and then to choose two candidates having the largest number of 1'st rank votes and thereafter to eliminate all remaining candidate(s) from consideration as potential winners; c) recasting the votes initially made for the eliminated candidate(s) based on each of the ballots assigned to the eliminated candidate(s) which show priority choices made by each voter for the remaining two candidates, and using only highest priority choice of each voter to reassign his vote to one of three remaining candidates, and then recompile the ballots for these candidates; d) declaring the candidate having the most initial and subsequently recast votes the winner. The will of each voter is thereby considered even when his preferred candidate(s) are eliminated, without the need for, the expense of, and the time required for succeeding elections when weaker candidates have been eliminated.

As in the general method above, where there are exceedingly large numbers of votes cast, all possible permutations of rankings for candidates are determined, and then all ballots cast are identified in one of the possible permutations so that a number of ballots cast for each possible permutation of rankings is first determined, and then the process described above is applied recasting all of the votes in each permutation as a group.

FIG. 4 is a more detailed illustration showing results which follow when using the above method when there are 5 different selections made on initially cast ballots.

While the invention has been described with preferred specific embodiments thereof, it will be understood that this description is intended to illustrate and not to limit the scope of the invention, which is defined by the following claims.

We claim:

1. A method of one round voting and vote tallying using a computer when a voter must choose between $n \geq 3$ candidates for a single vacant position comprising the following steps:
   a) requiring the voter to rank and numerically prioritize the candidates he chooses for the single vacant position on the ballot, to reflect his priority of choices;
   b) enabling the computer to identify all possible permutations of rankings for the candidates, and then programming the computer to associate each ballot cast with one of the possible permutations so that a total number of ballots cast in each possible permutation of rankings is determined;
   c) programming the computer to tally the number of 1'st rank votes for each candidate and then choose two candidates having the largest number of 1'st rank votes and then to eliminate all remaining candidate(s) from consideration as potential winners;
   d) programming the computer to recast the votes initially made for the eliminated candidate(s) based on each of the ballots assigned to the eliminated candidate(s) which show priority choices made by each voter for the remaining two candidates, and using only a highest priority choice of each voter to reassign his vote to one of two remaining candidates, and then recompile the ballots for these candidates;
   e) declaring the candidate having the most initial and subsequently recast votes the winner;
   thereby ensuring that the will of each voter is considered even when his preferred candidate(s) are eliminated, without the need for, the expense of, and the time required for succeeding elections when weaker candidates have been eliminated.

* * * * *